United States Patent [19]

Schumacher et al.

[11] Patent Number: 5,381,645
[45] Date of Patent: Jan. 17, 1995

[54] CONTROL FOR A STRUCTURAL ASSEMBLY SELF-ALIGNINGLY SUPPORTED ON AN AGRICULTURAL MACHINE

[76] Inventors: Gustav Schumacher, Gartenstrasse 8; Guenter Schumacher, Raiffeisenstrasse 10, both of, D-5231 Eichelhardt, Germany

[21] Appl. No.: 56,507

[22] Filed: May 3, 1993

[30] Foreign Application Priority Data

May 6, 1992 [DE] Germany ............................ 4214466

[51] Int. Cl.$^6$ ............................................. A01D 47/00
[52] U.S. Cl. ................................ 56/10.2 E; 56/14.5; 56/15.8
[58] Field of Search ............... 56/10.2 E, 10.2 F, 14.5, 56/15.2, 15.7, 15.8, 208

[56] References Cited

U.S. PATENT DOCUMENTS

| | | | |
|---|---|---|---|
| 4,151,700 | 5/1979 | Gardella | 56/14.5 X |
| 4,206,582 | 6/1980 | Molzahn et al. | 56/15.8 |
| 4,313,294 | 2/1982 | Martenas | 56/DIG. 10 X |
| 4,565,056 | 1/1986 | Heidjann | 56/15.8 X |
| 4,759,173 | 7/1988 | Ostrup et al. | 56/208 |
| 4,869,058 | 9/1989 | Ostrup et al. | 56/208 |

*Primary Examiner*—Terry Lee Melius
*Attorney, Agent, or Firm*—Helfgott & Karas

[57] ABSTRACT

A control for a structural assembly oscillatingly supported around a swivel axis on a base unit in a harvesting machine and including a cutter table inclinably supported about an axis of rotation relative to a conveyor channel, has an hydraulic operation cylinder. The inclination of the cutter table relative to the conveyor channel is effected by the hydraulic operation cylinder pivoted at one end to the conveyor channel and at the other to the cutter table. An hydraulically loaded relief cylinder, the pressure medium of which is cushioned by a pressure reservoir, is installed with one end to the conveyor channel and with the other end to the cutter table so as to balance a position of the cutter table relative to its point of rotation by the force of the relief cylinder.

3 Claims, 2 Drawing Sheets

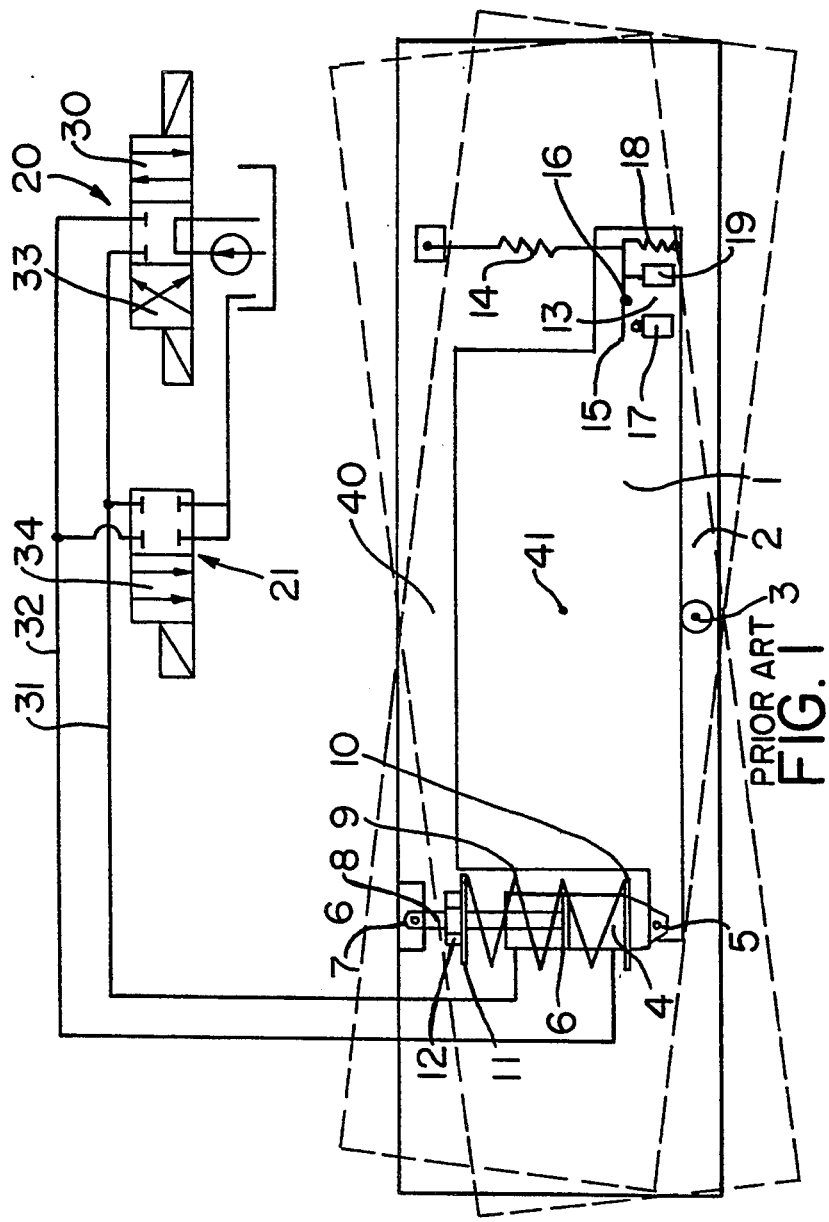

CONTROL FOR A STRUCTURAL ASSEMBLY SELF-ALIGNINGLY SUPPORTED ON AN AGRICULTURAL MACHINE

BACKGROUND OF THE INVENTION

The present invention relates to a control for a structural assembly oscillatingly supported around a swivel axis on a base unit in a harvesting machine.

In the following specification, the invention is described with reference to a cutter table oscillatingly secured to a harvester thresher as representing all such structural assemblies as mowers, harvesters and other harvesting machines.

In the operation of a harvester thresher, the cutter of this machine, in the majority of cases, has to be so guided over the ground that it will not dig into the soil but on the other hand will support its residual weight on the ground so as not to lift up in case of ground unevennesses but rather will follow these unevennesses of the ground and cut the wheat at a constant height.

In order to determine the residual weight, the cutter tables are supported by springs relative to the undercarriage.

In the past, the cutter table used to be mostly secured rigidly to the conveyor channel and thus in parallel to the transversal axis of the harvester thresher. For lifting or lowering, respectively, the cutter table, the cutter table was rotated around its transversal axis.

In the operation, for instance in an inclined field, if very broad cutter tables are used it might happen that the table digs into the ground at the lower side of the field inclination since the heavy harvester thresher will, with its wheels, sink deeper into the ground at the lower side of the inclination then on the upper side. The machine with its transversal axis is not, therefore, in parallel to the inclination of the ground. The cutter table which is often twice as wide as the machine, unless it can slue or swing around the longitudinal axis of the harvester thresher, does not have an inclination parallel to the ground. On the lower side of the inclined field, it will dig into the ground and on the upper side of the field it will be guided at a distance above ground.

Inclination equalizing systems are on the market which adjust the inclination of the cutter table. These systems are designed as freely swinging or oscillating systems wherein the cutter table is kept in the optimum inclination by the ground contact pressure or is kept in position by force-actuated swiveling devices.

Such devices may directly be mounted at the conveyor channel and the cutter table, but they may also constitute part of a two-piece adapter one part of which is assigned to the conveyor channel and the second to the cutter table. The oscillating systems operate in a way that one adapter part can be swung relative to the second adapter part. Such an adapter oscillation system has the advantage that neither the conveyor channel nor the cutter table originally provided without an oscillation system have to be changed.

The free oscillation of the cutter table has the advantage that the ground contact of the cutter table determines its optimum inclination. Such systems have for instance been known from German Offenlegungsschrift No. 35 44 918 and GDR Patent Specification No. 94,725. Free oscillation is the more functional the easier the table can oscillate.

The majority of cutter tables, however, have so been designed that they are imbalanced relative to the centre of the latitude since the weight of the drives for cutter knives, drawing-in worm gear and winch have mostly been provided on only one cutter table side. In case of a free oscillation around a central axis, the cutter table is therefore inclined to the heavier side. The operation of the free oscillation is seriously hampered.

In order to balance out the equilibrium, additional weights have been mounted on the lighter side; it is not, however, of advantage to additionally increase the weight of the cutter table which is heavy by itself.

In order to provide for equilibrium in case of an imbalanced cutter table, a spring mechanism has been described, according to German Offenlegungsschrift No. 35 44 918, wherein via an angular lever a roller support is provided on the bracket of the conveyor channel, the roller support being spring-loaded.

This sophisticated structure is very much endangered through damages when affixing the cutter table and, secondly, it has to be correspondingly biased at each coupling process in order to have the spring force available over the whole oscillation range.

A similar mode of operation has been described in German Patent Specification No. 2,208,243. But in this case, too, the great disadvantage consists in that when coupling the cutter table on or off, the equalizer spring either has to bias, or relax, respectively, itself or has to be manually released prior to coupling off or manually tensioned after coupling on. If the spring tensions or relaxes automatically in the coupling process, the danger of an accident is imminent since the cutter table wants to position itself about half the oscillation path in oblique position relative to the conveyor channel before it is completely coupled on or off. This effect arises because the spring with a view to the path-dependent changing spring force does not operate evenly over the whole oscillation path.

When the cutter table is lifted, it is important and desirable that the cutter table oscillates into its position parallel to the harvester thresher. Particularly with a view to the desired easy-moving free oscillation, the problem is encountered that unless corresponding means are provided which lock oscillation as soon as the table is lifted, the cutter table will bend to and fro. This can already set in by vibrations of the machine caused by uneven ground but also by uneven feeding of the table with harvested material.

In GDR Patent Specification No. 94,725 and German Patent Specifications No. 2,133,746 and 2,208,243, stabilizer springs have been described which will draw or push an oscillatingly inclined cutter table into the parallel again as soon as the table is taken from ground contact. These springs however have beforehand to be biased during the oscillation process and hence impair the smoothness of the oscillation movement when copying the ground contour. The ground contact pressure required for guiding the table according to the ground contour must for this reason be selected higher and the disadvantages thereof have to be accepted.

Controlled oscillation is provided by one or two hydraulic cylinders. This can be performed by manually operated control of the hydraulic cylinders or by sensors on the cutter table trough which scan the distance of the cutter table from the ground and pass corresponding pulses to the control valve for the hydraulic cylinders. The problem in case of manual control is that, particularly in case of bad view caused by dust or darkness, the table inclination is not exactly seen by the operator. This causes in many cases that a highly uneven stubble height corresponding to the width of the cutter table is obtained. This again is of disadvantage for subsequent stubble processing.

Sensors, scanners and similar devices ascertaining the ground contour have the great disadvantage that they have to be provided too far behind the cutter edge and therefore can actively react only when the cutter bar has already passed the changed ground contour and, secondly, cannot differentiate genuine from non-genuine obstacles. A heap of straw or loose soil should not initiate action whereas for instance a heavy stone should provide that the cutter table is actively oscillated.

The free oscillation according to the ground contour by the weight of the cutter table supported on the ground, as referred to, is to be preferred when guiding automatically. In this case, the two outer skids which as a rule extend beyond the cutter edge of the cutter table are sufficient to generate, by their supporting force on the ground, the oscillating movement of the cutter table. On the other hand, however, it is also desirable to be able to manually adjust the inclination in case of a higher-adjusted cutter table.

In both cases, however, the cutter table should automatically find its position in parallel to the transversal axis of the harvester thresher if the operator so wishes.

SUMMARY OF THE INVENTION

It is therefore an object of the present invention to provide a control for a structural assembly oscillatingly supported around a rotational axis on a base unit in an agricultural machine, which solves one or a plurality of the following problems:

1. In case of ground contact, guide the cutter table freely oscillating in accordance with the ground contour,
2. Alternatively, guide the table by means of sensors,
3. Perform oscillation by means of manual control wherein the remaining control position can be overdriven,
4. Return the cutter table, in response to a corresponding command or after removing it from ground guidance, automatically and sufficiently safely, into its position parallel to the transversal axis of the harvester thresher, and
5. By a simple structure, restore equilibrium of the cutter table relative to its oscillation point of rotation, even if the cutter table as such is imbalanced.

In order to solve this problem, it has been suggested, in applicant's prior patent application No. P 41 27 189.0, to provide a control wherein a spring bridges the hydraulic operating cylinder and is supported on one end at the operating cylinder and on the other end at the piston rod of the operating cylinder and by suitable means, for instance a screwed nut on one threaded range of the piston rod is so biased that the spring force balances an inequilibrium of the cutter table relative to its point of rotation.

One disadvantage of this embodiment is the sophisticated construction for installing the spring around the operating cylinder. Also, the adjustment of the spring bias because of the threaded range provided on the piston rod is time consuming. This is particularly annoying if, when exchanging differently wide cutter tables on one and the same machine, different biases of the equalizing spring have to be performed. In a further development of this older invention and to abolish these structural disadvantages, it is suggested according to the invention to employ, instead of a mechanical spring, an hydraulic cylinder loaded by an hydraulic pressure reservoir as the equalizing spring element. In order to vary the spring force, the hydraulic side of the pressure reservoir is connected with an hydraulic pressure source and adjustable.

Lift cylinder(s) as pressure source for the cutter works have shown to be particularly cost-saving. Since each of the, often very different, cutter works, have to be balanced only once, that is after coupling on, a simple shut-off valve in the duct between cutter works lift cylinder and balancing cylinder, or pressure reservoir, respectively, is sufficient in order to obtain the correspondingly correct pressure for the balance of the cutter table. To this end, it is sufficient to lift the coupled-on cutter table so that pressure is built up in the lift cylinder of the cutter table, to switch the operating cylinder for table oscillation into floating position and to open the shut-off valve until the table moves automatically into balance. Subsequently, the shut-off valve is closed again and free oscillation is ready for operation.

BRIEF DESCRIPTION OF THE DRAWINGS

FIGS. 1, 2 and 3 show the prior art solution according to applicant's prior patent application No. P 41 27 189.0.

DESCRIPTION OF THE INVENTION

Figure 4:
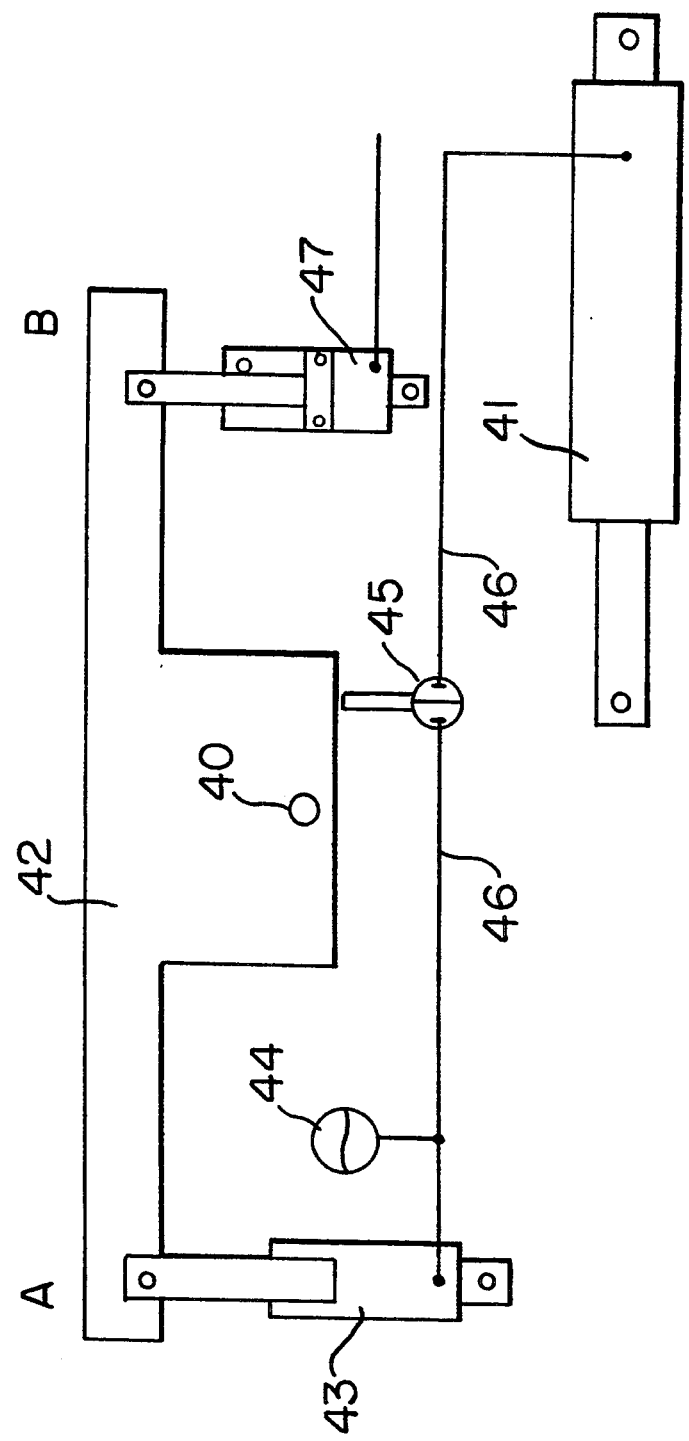
FIG. 4 shows the embodiment according to the present invention wherein, for simplicity sake, the latter is only shown as a diagram since the function has not been changed as compared to the parent application.

FIG. 1 shows a prior art cutter table connected to the conveyor channel, as seen from the harvester thresher, i.e. in the direction of motion, together with the circuit diagram of the control according to the invention, the operating cylinder and the oscillation measuring and switching device.

FIG. 2 shows the switching positions of a cross switch for the oscillation device, and FIG. 3 shows the switching positions for the height control of the cutter table.

The cutter table or an adapter portion 2 to be assigned to the cutter table, is sluingly supported, at 3, on the conveyor channel or on an adapter portion 1 assigned to the conveyor channel. For simplicity sake, the terms conveyor channel and cutter table will in the following be used only although in many cases a two-piece adapter is mounted between these two elements.

A double-acting operating cylinder 4 is pivoted, at 5, to conveyor channel 1 and, at 6, to cutter table 2. If piston 7 is in the middle of its stroke to be traversed in the cylinder, cutter table 2 is in parallel to conveyor channel 1. If piston rod 8 is projected beyond the middle position of the piston, the cutter table is lowered on the left side as seen in the direction of motion; if it is retracted beyond the middle position of the piston, the table bends to the right side, in each case swinging around point of rotation 3. Supposing that the table has a higher weight on the left side relative to its point of rotation 3, because of the drive aggregates, than on the right side, such higher weight will be compensated for by spring 9 supported, on one end, on a flange 10 of operation cylinder 4 and, on the other end, on a flange 11 on piston rod 8 of operation cylinder 4. The spring, corresponding to the greater weight, is biased on one cutter table side. This bias is adjusted by threaded bolt 12 on a threaded range of piston rod 8 in acccordance with the weight difference relative to point of rotation 3. Such adjustment is at its optimum if the cutter table has its parallel position relative to the conveyor channel, it the pressure spaces of operation cylinder 4 are pressureless or, as will be described lateron, are in floating position.

Between conveyor channel 1 and cutter table 2, furtheron, switching device 13 is provided which can emit switching pulses if the table is not in parallel position relative to the conveyor channel. If the table swings to the left, resiliently designed traction means 14 pulls switching lever 15 beyond its point of rotation 16 upward thus closing switch 17. If the table swings to the right, that is if it bends on the right side as seen in the direction of motion, spring 18 pulls switching lever 15 downward and switch 19 is actuated.

The hydraulic control comprises three-position valve 20 and two-position valve 21 which is normally in the shut-off position as shown.

The control switch is provided as a cross switch as in accordance with FIG. 2. For a better view, the electric control leads were not shown since with a view to modern SPS controls and other electronic switching means a plurality of possibilities are available to generate the switching pulses and their connection with one another. In the following, only the individual control circuits for the hydraulic control will be explained.

Control switch 2 according to FIG. 2 comprises switch positions L for Left Descend, R for Right Descend, S for Floating Position and P for Parallel Position.

If L is switched on, part 30 becomes active on valve 20. The pressure space of operating cylinder 4 receives, on the piston rod side, pressure medium via duct 31, and via duct 32, pressure medium is released from the pressure space on the piston side. The table swings to the left, that is it descends on the left side. If the control switch is switched to R, part 33 of valve 20 is actuated and the table swings to the right, that is it descends on the right side. If the control switch is set to S, part 34 of valve 21 becomes active and connects the two ducts 31 and 32 with the tank. Both pressure spaces of operation cylinder 4 become pressureless and the cutter table can freely oscillate into both directions about its point of rotation 3.

If the control switch is set to P, valve 21 is, firstly, switched again into the shut-off position and, secondly, switching position 13 is activated. Depending on the oscillation position, the latter emits corresponding switching pulses to valve 20 and the operation cylinder 4 fixes itself in the middle position and hence cutter table 2 is fixed in parallel position relative to conveyor channel 1.

Control command P can also be used for switch-over to sensor control. The sensor control referred to including scanners or contact strips or other distance-measuring sensors under or at the cutter table trough have been known and are not, therefore, shown in detail in the drawing.

If a prior art cutter table height control device is installed on the harvester thresher, a cross switch according to FIG. 3 has been provided for it. In this connection, a command combination for height and oscillation control is suggested. If the control switch according to FIG. 3 is switched to A=Automatic, which means that the cutter table is guided with a residual weight in ground contact, command S= Floating Position, coupled to A, is also emitted. Valve 21 is switched to part 34. On command L=Position (FIG. 3), the table is guided at a determined height above ground, i.e. not in ground contact. By this command, the oscillation device is also switched to sensor control. If command H=Lift is switched, the command for the oscillation device for parallel positioning of cutter table 2 relative to conveyor channel 1 is simultaneously issued.

Such a combination makes the operation of the machine much easier for the operator.

In the drawing, the point of rotation of cutter table 2 has been provided below conveyor channel 1, at about the middle thereof, at 3. It is self-evident that the point of rotation can also be provided above the conveyor channel, about at 40. It is also possible, by a special bearing via rollers or a capstan, to provide the point of rotation in the middle of the conveyor channel (at about 41). If the table is heavier on the right than on the left, operation cylinder 4 may also be provided on the right side of the conveyor channel. The provision of the operation cylinder is also possible above or under the conveyor channel.

switching device 13 for automatic positioning is also conceivable at all places where the angle of inclination between conveyor channel and cutter table relative to each other can be used for switching purposes.

Switching device 13, for the rest, constitutes only an exemplified embodiment. It may be realized by means of potentiometers, cam switches and various other switching elements. The plurality of possibilities, such as capacitance switches, switching elements integrated within the operating cylinder, and optical measuring and switching elements have been known to those versed in the art and need not be explained in detail.

In the embodiment according to the invention as shown in FIG. 4, it is assumed that the cutter table is hearer, at A, relative to the point of rotation (40) and that lift cylinder (41) for the cutter table is under hydraulic pressure. On side A of cutter table (42), balancing cylinder (43) is pivoted which is supported at the other end on the, not-shown, conveyor channel. Assigned to the balance cylinder, pressure reservoir (44) is connected in the hydraulic system. A shut-off valve (45) which can both electrically and manually be actuated is provided in duct (46) between lift cylinder (41) and balance cylinder (43).

Also on the cutter table, at B, double-acting hydraulic cylinder (47) is pivoted which, on the other end, is also pivoted to the conveyor channel, not shown.

It is assumed that pressure reservoir (41) is pressureless on the hydraulic side, and shut-off valve (45) is closed and operation cylinder (47) is switched to Floating Position. Because of the greater weight, at A, cutter table (42) has pitched on this side. In order to provide for the balance of the table, shut-off valve (45) is opened. From lift cylinder (41), pressure medium flows into balance cylinder (43) and into pressure reservoir (44) connected with it. The balance cylinder balances the different weight between A and B of the cutter table, and as soon as the table is in the horizontal position, shut-off valve (45) is closed.

Hydraulic reservoir (44) is so dimensioned that the complete desired oscillation path of cutter table (42) can be performed with a very flat spring characteristic.

By means of corresponding controls as described in German patent application No. P 41 27 189.0 and shown in FIGS. 1, 2 and 3, the cutter table may be adjusted, via the operation cylinder, in any position contrary to the free oscillation.

We claim:

1. Control for a structural assembly oscillatingly supported around a swivel axis on a base unit in a harvesting machine, said structural assembly including a cutter table inclinably provided around a longitudinal axis of a harvester thresher, an hydraulic operation cylinder, said cutter table being inclinable relative to a conveyor channel about a point of rotation when load is applied to one side of said cutter table, inclination of said cutter table relative to the conveyor channel being effected by said hydraulic operation cylinder pivoted at one end to said conveyor channel and at the other end to said cutter table, a pressure reservoir (44), an hydraulically loaded relief cylinder (43), the pressure medium of which is cushioned by said pressure reservoir (44) which is installed with one end to said conveyor channel (42) and with the other end to the cutter table so as to balance a [disequilibrium]position of said cutter table (2) relative to said point of rotation (40) by the force of said relief cylinder to return said cutter table from an inclined position to a horizontal position.

2. Control according to claim 1, and further comprising a lift cylinder (41) and wherein an hydraulic side of said pressure reservoir is connected via an hydraulic duct (46) to said lift cylinder (41) to adjust a spring force of said pressure reservoir.

3. Control according to claim 1, wherein a shut-off valve (45) is provided to lock said hydraulic duct (46) between said lift cylinder (41) and said pressure reservoir.

* * * * *